May 4, 1948. J. H. PORTER 2,440,785
SNOW VEHICLE
Filed May 2, 1946 3 Sheets-Sheet 1
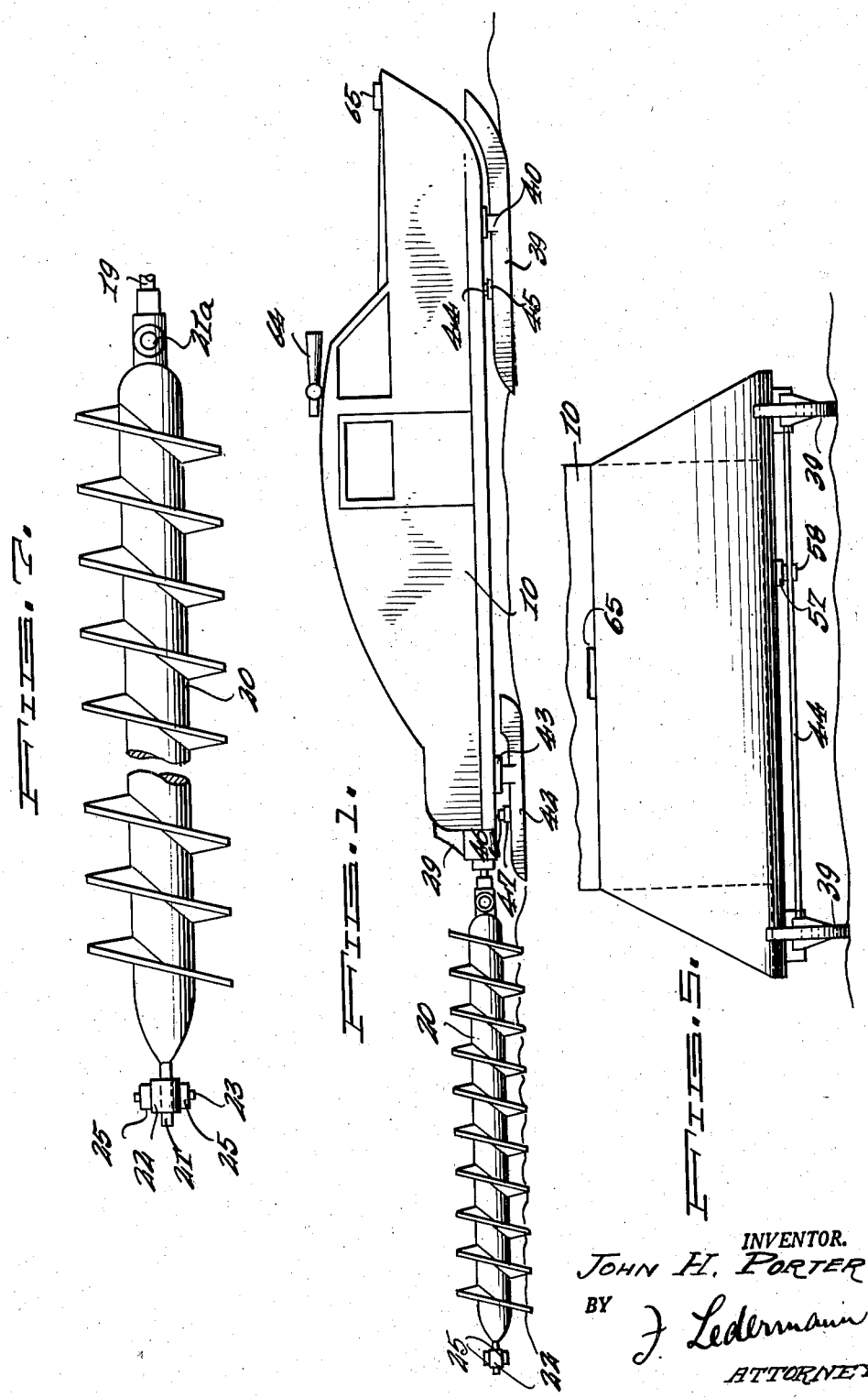
INVENTOR.
JOHN H. PORTER
BY J. Ledermann
ATTORNEY.

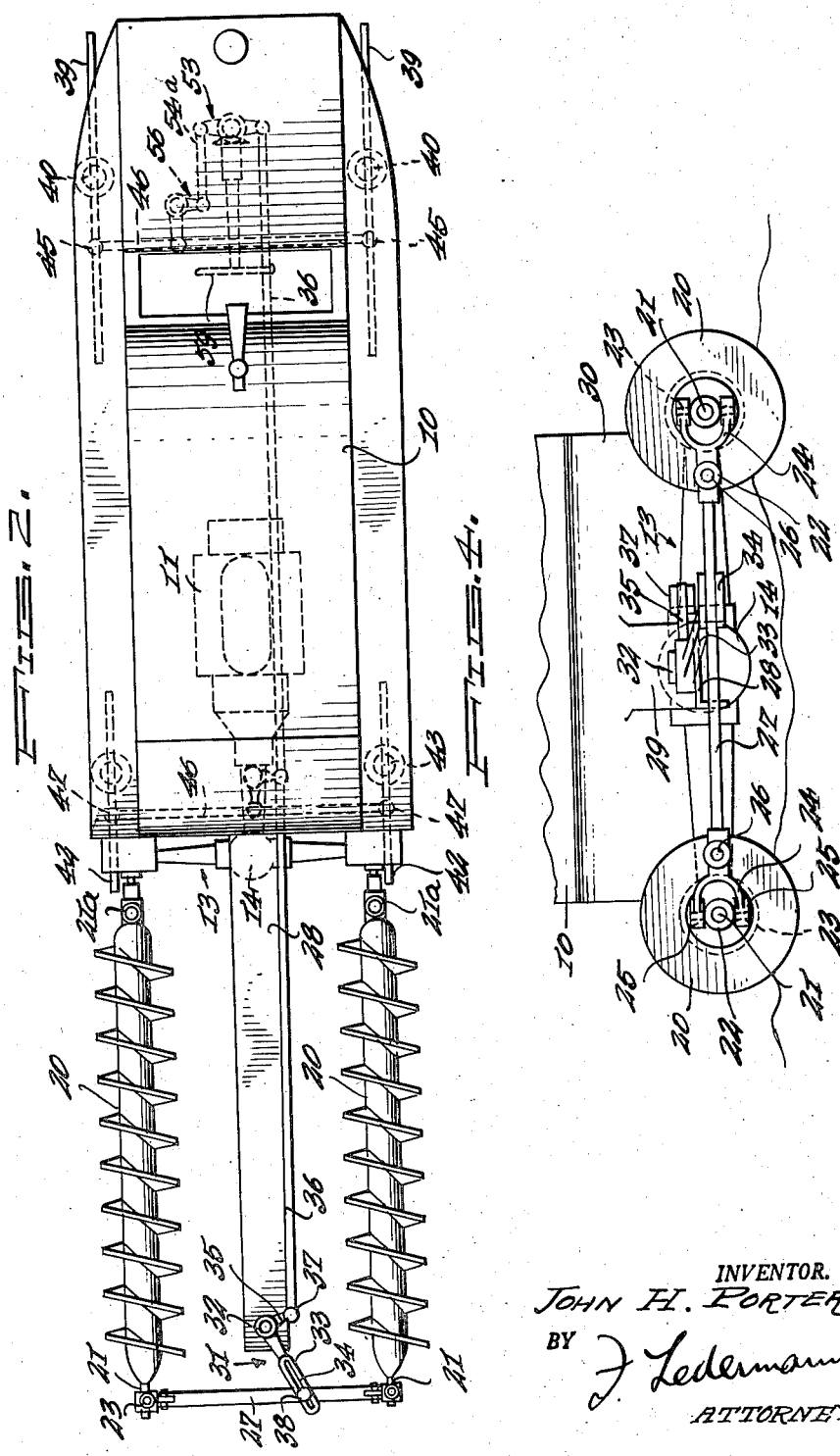

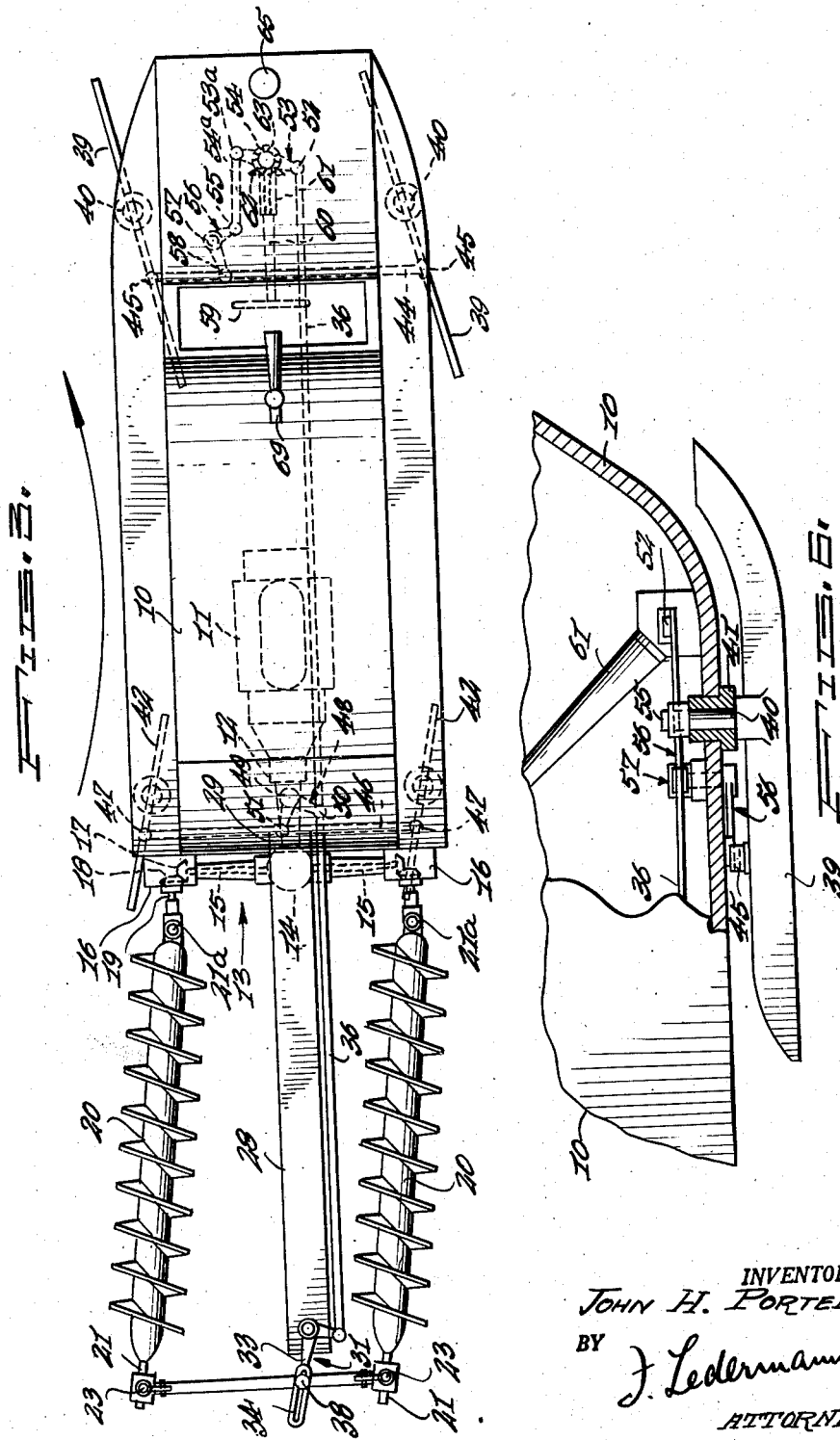

Patented May 4, 1948

2,440,785

UNITED STATES PATENT OFFICE 2,440,785

SNOW VEHICLE

John H. Porter, Fay, Okla.

Application May 2, 1946, Serial No. 666,549

4 Claims. (Cl. 180—3)

This invention relates to snow vehicles, and aims to provide a novel sled-like vehicle having means for propelling or driving the same over snow-covered roads or other surfaces.

The invention utilizes an engine to drive rotary augers or screws which trail the vehicle, by engagement with the snow whereby the vehicle is pushed by the screws. Synchronously dirigible front and rear sled runners are provided for steering the vehicle, and to facilitate steering the screws are linked at both ends in parallelogram fashion to swing complementarily with the dirigible front runners.

The above general as well as additional and more specific objects will become apparent in the following description, wherein characters of reference refer to like-numbered parts in the accompanying drawings. It is to be noted that the drawings are intended for the purpose of illustration only, and that it is neither desired nor intended to limit the invention necessarily to any or all of the specific details of construction shown excepting insofar as they may be deemed essential to the invention.

Referring briefly to the drawings,

Fig. 1 is a side elevational view of the vehicle.

Fig. 2 is a plan view of the same.

Fig. 3 is a plan view of the vehicle, showing the relative positions of the various parts involved in making a turn.

Fig. 4 is a fragmentary rear elevational view of the vehicle.

Fig. 5 is a fragmentary front elevational view of the same.

Fig. 6 is a fragmentary side elevational view of the forward portion of the vehicle, with parts broken away and partly in section, showing a portion of the steering mechanism.

Fig. 7 is an enlarged side elevational view of one of the propelling screws and the members connected to the ends thereof.

Referring in detail to the drawings, the numeral 10 indicates a vehicle body in which a prime mover such as, for instance, and internal combustion engine 11, is mounted, whose drive shaft 12 extends rearward. A complete rear housing 13 is mounted at the rear of the vehicle, including a standard differential 14 into which the drive shaft 12 enters in the standard manner to drive the rear axles 15 in the usual way. End housings 16 are mounted at the ends of the rear housing 13 and contain bevel gears 17 on the axles 15 in mesh with bevel gears 18 on stub shafts 19 at right angles to the axles. Trailing screw propellers 20 are secured at their forward ends by universal joints 21a to the stub shafts 19. Spindles 21 on the rear ends of the screws register rotatably in bearing collars 22 which have diametrically opposed pins 23 rigid thereon which register pivotally in aligned collars 25 on the ends of the arms of yokes 24. These yokes are pivoted at 26 on the ends of a cross rod 27, although they may also be rigid thereon, not shown. It is apparent from the description to this point, that with the drive shaft of the engine rotating, the screws 20 are rotated in the bearings of the stubs shafts 19 within the end housings 16 and in the bearings 22.

A channel beam 28 is supported in cantilever fashion by means of its bracket end 29 from the rear wall 30 of the body 10, and extends rearward to a point near the cross rod 27. A bell crank 31 is pivotally secured at 32 to the beam 28, having a long arm 33 which is slotted at 34 and a short arm 35 which is pivoted to a rod 36 at 37. A pin 38 upstanding from the rod 27 registers in the slot 34. The distance between the rear bearings of the screws 20 is equal to that between their front bearings.

Front sled runners 39 are pivotally mounted by means of their upright pins 40 registering in bushings 41 in the body 10. In the same manner rear sled runners 42 are pivotally mounted at 43 on the body 10. A connecting rod 44 is pivoted at its ends 45 to the front runners 39, substantially as shown, and likewise a connecting rod 46 is pivoted at its ends 47 to the rear runners 42. A bell crank 48 is pivotally secured at 49 to the body 10; one arm thereof is pivoted at 50 to the rod 36 and the other arm is pivoted at 51 to the rod 46. The rod 36 extends forward of the vehicle and its forward end is pivoted at 52 to one end of a rocker 53 which is pivoted at 54 in the body 10. The other end of the rocker is pivoted at 53a to a link 54a which in turn is pivoted to one arm of a bell crank 56 at 55, the other arm of this bell crank being pivoted at 58 to the cross rod 44; the bell crank 56 is pivoted to the body 10 at 57. A steering wheel is provided at 59, whose post or column 60 passes through the shell housing 61 and has at its extremity a bevel gear or sector 62 in mesh with a bevel gear 63 fixed to and concentric with the pivot 54.

It is now apparent that when the steering wheel 59 is turned for the purpose of steering the sled in one direction, the rocker 53 will be turned in a clockwise direction (Fig. 3) into, say, the position shown in Fig. 3. Thereby the rod 36 is pushed longitudinally rearward and the bell crank 56 is turned counter-clockwise while the bell crank 48 is turned clockwise, thus positioning the front and rear runners as shown in the said figure. Reverse movement of the steering wheel will reverse the direction of movement of both sets of runners, whence it is obvious that steering of the body 10 is achieved by swinging the two sets of runners in opposite directions. This is desirable because it travels on snow.

Since the screws 20 lie to a depth in the snow, if they were not also steered or moved in synchronism with the rear runners 42 they would put such a drag upon the vehicle to resist turning it out of a straight ahead direction, as would thwart the attempt to steer the vehicle. The parallelogram construction above described, of which the screws 20 are a part, was therefore provided. It is obvious that, since the bell crank 31 is positioned in phase, so to speak, with the bell crank 48, it is turned by the rod 36 synchronously with the latter so that the cross rod 27 is pushed by the slotted arm of the bell crank 31 in the same direction and simultaneously with the bell crank 48. Thus the screws 20 are also simultaneously moved to assist in steering of the vehicle through the snow. A horn has been shown at 64 and the radiator cap of the vehicle at 65.

Obviously, modifications in form and structure may be made without departing from the spirit and scope of the invention.

I claim:

1. A snow vehicle comprising a body, front runners pivotally mounted on said body, steering means for turning said front runners, an engine in said vehicle having a drive shaft extending therefrom, aligned rear axles rotatably mounted on the vehicle, differential means for rotating said axles upon rotation of said drive shaft, stub shafts extending rearward from the outer ends of said axles, rearwardly extending propeller screws, universal joints connecting the forward ends of said screws with said stub shafts, rear runners pivotally mounted on the vehicle, a transverse rod having the rear ends of said screws rotatably mounted in the ends thereof, means connecting said steering means with said rear runners for turning said rear runners in the opposite direction to said front runners upon actuation of said steering means, and means connecting said connecting means with said transverse rod for moving said transverse rod substantially longitudinally of itself in substantially the same general direction as the rear ends of said rear runners upon said actuation of said steering means to swing said screws in approximate synchronism with said rear runners.

2. The snow vehicle set forth in claim 1, said steering means comprising a steering post and a rocker pivoted at its mid-point to the vehicle and means partly on said post and partly on said rocker for turning said rocker about its pivot upon rotation of said post, means connecting one end of said rocker with said front runners for turning said front runners in one direction upon rotation of said post, said first-named connecting means comprising an elongated rod extending rearward and having its front end pivoted to the other end of said rocker, means pivotally connecting said elongated rod with said rear runners for turning said rear runners in the opposite direction upon rotation of said post, and means pivotally connecting the rear end of said elongated rod with said transverse rod for moving said transverse rod longitudinally as aforesaid upon rotation of said post.

3. A snow vehicle comprising a body, a pair of front runners and a pair of rear runners, each of said runners being pivotally mounted intermediate its length to said vehicle, a pair of screws extending rearward from the vehicle, means on the vehicle for rotating said screws, universal joints connecting the forward ends of said screws with said rotating means, a transverse rod having the rear ends of said screws rotatably mounted therein, a support extending rearwardly from the body between said screws, a second transverse rod having its extremities pivoted to the runners of the said rear pair of runners rearward of the pivot points of said rear runners, a third transverse rod having its extremities pivoted to the runners of said front pair of runners rearward of the pivot points of said front runners, a steering post, a rocker pivotally mounted on the vehicle, means partly on said rocker and partly on said post for turning of said rocker upon turning of the post about its axis, a bell crank pivoted to said support, one arm of said bell crank having a slot therein, said first transverse rod having a pin thereon, said pin registering in said slot, an elongated rod having one end pivoted to one end of said rocker and the other end pivoted to the other arm of said bell crank, a second bell crank pivoted to the vehicle, one arm of said second bell crank being pivoted to said second transverse rod and the other arm thereof being pivoted to said elongated rod, a third bell crank pivoted to the vehicle and having one arm thereof pivoted to said third transverse rod, a link having one end pivoted to the other arm of said rocker and the other end thereof pivoted to the other arm of said third bell crank.

4. The snow vehicle set forth in claim 3, said means partly on said rocker and partly on said post comprising a bevel gear on said rocker and a bevel gear on said post in mesh with said first bevel gear.

JOHN H. PORTER.

REFERENCES CITED

The following references are of record in the file of this patent:

UNITED STATES PATENTS

| Number | Name | Date |
|---|---|---|
| 864,106 | Peavy | Aug. 20, 1907 |
| 869,170 | Foote | Oct. 22, 1907 |
| 1,334,788 | Pasko | Mar. 23, 1920 |
| 1,546,805 | St. Pierre | July 21, 1925 |
| 1,567,776 | Walker | Dec. 29, 1925 |
| 1,602,924 | Molitor | Oct. 12, 1926 |

FOREIGN PATENTS

| Number | Country | Date |
|---|---|---|
| 210,261 | Germany | July 10, 1908 |